April 7, 1931. P. HALLOT 1,799,898
MOTOR CAR BRAKE
Filed Feb. 17, 1927
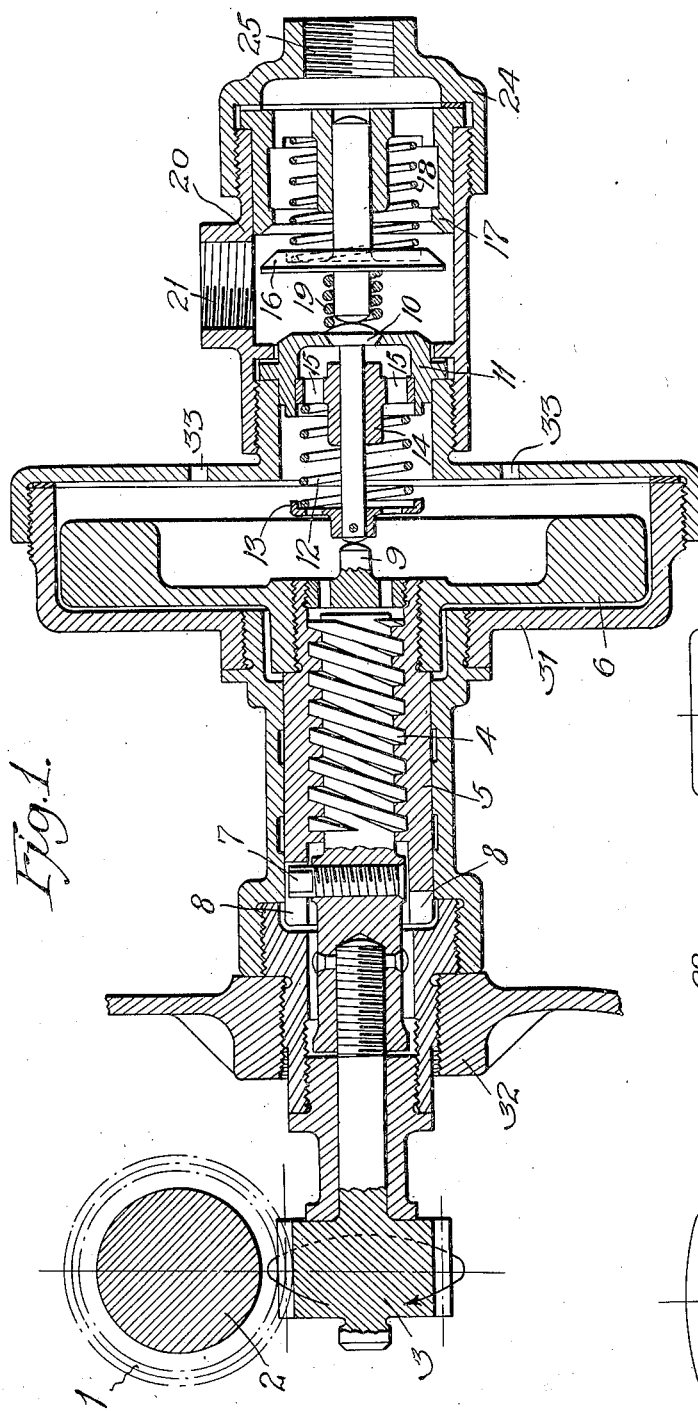
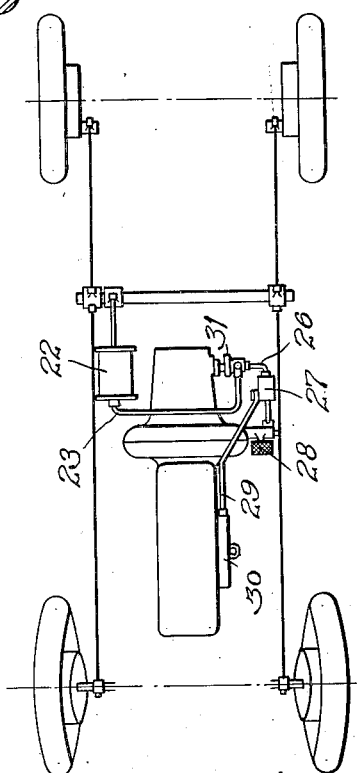
Inventor
Paul Hallot Patented Apr. 7, 1931

1,799,898

UNITED STATES PATENT OFFICE

PAUL HALLOT, OF PARIS, FRANCE

MOTOR-CAR BRAKE

Application filed February 17, 1927. Serial No. 169,105.

In daily used motor car brake called "vacuum brakes" the control of brake gear relies upon a piston movable in a cylinder, into which, by means of an appropriate distributor, the vacuum produced by the motor aspiration may be induced in order to effectuate the braking.

Such a device requires, to work, only a slight effort from the driver, the braking effort being given by the apparatus that produces the vacuum in the brake cylinder. But that vacuum may be too sudden or too great, because it is difficult to moderate the action of the driver's foot upon the distributor controlling pedal; therefore, a too high braking may take place, causing the wheels to be jammed.

The present invention has for its object a governor for any vehicle brakes operated by fluid pressure and specially appropriate to railway cars and motor vehicles fitted with brakes called "vacuum brakes." Whilst it leaves to the braking effort its highest rate, said governor absolutely prevents the jamming of the wheels and therefore abolishes all the dangerous inconveniences of skidding, side sliding, loss of driving control, etc.

Being destined to be disposed between the brake cylinder and the distributor, said governor, object of the invention, is featured by the application upon the pipe which connects the distributor to the cylinder, by two valves, the one of which can obturate the connecting pipe, the other one can open this pipe to the atmosphere.

These two valves, in normal driving, are respectively opened and shut, and are controlled by means of a screw nut, constantly connected to the wheels which are to be braked and, through the play of the potential energy of weights made solid with it, may be displaced following the axis of the valves and therefore control said valves.

In order to disclose the features and advantages of the invention, it has hereunder been described, as an instance only, a form of carrying out said invention, corresponding to the figures of the accompanying drawings, among which Fig. 1 is a longitudinal sectional view of the governor, the object of the invention, and Fig. 2 a schematic view of a frame fitted with vacuum brakes improved by said governor.

In those figures, an endless screw —1—, fastened on the secondary shaft —2— of the speed box (or upon any other shaft constantly connected to the driving wheels) controls an helicoidal pinion —3— jointedly connected to a large-thread screw —4—, which carries a screw nut —5— upon which a weight —6— is fastened. The screw nut —5— may be displaced with little friction upon the screw —4—, but its displacement is limited by a stop —7—, secured on the screw —4—, that stop being in contact with the edges of a notch —8—, cut into the nut screw —5—.

A central pin —9— screwed into the nut —5— can abut the stem of a valve —10—, maintained upon its seat —11— by a spring —12— bearing at one end upon the seat —11— and at the other end upon a cup fastened on the stem of the valve —10—. The seat —11— carries a piece —14— pierced with holes —15—, which guides the valve —10—.

Another valve —16—, not bearing, in normal use, upon its seat —17—, through the play of a spring —18—, may be controlled by the valve —10— through the spring —19—.

The chamber of both valves —10— and —16— is made, on one part, of a piece —20— having a screwed part —21— that may be connected to the cylinder —22— (Fig. 2) by a pipe —23— and on the other part, of a stopper —24— carrying a screwed part —25— that may be connected by means of a pipe —26— to a distributor —27—, of any system, controlled by the pedal (Fig. 2). Said distributor —27— is connected by a pipe —28— to the admitting pipe —30— of the motor.

The whole of the rotating parts of the apparatus are shut in a casing or cover —31— (Fig. 1) made of several pieces, said casing or cover —31— is screwed on a part —32— of the speed box.

When the car is in motion, the pinion —3— draws along the screw —4— in the direction of the arrow, the screw —4— draws along the nut —5— and the weight —6— and this last member through its inertia, causes the screwing of the nut —5— upon the screw —4—, till the largest side of the notch —8— is in contact with the stop —7—; the whole apparatus is now in the position of Fig. 1.

If the brake pedal is lowered, (Fig. 2) the distributor —27— is opened, the air in the brake cylinder is aspirated by the pipe —23—, passes between the valve —16— and its seat —17—, follows the pipe —26—, passes into the distributor —27—, and finally into the admitting pipe-gear —30— of the motor. When the vacuum is too strong in the cylinder —22—, the rotation of the rear wheels slackening, the pinion —3— and therefore the screws —4— are near stopping too. But the nut —5— and the weight —6— having collected an amount of energy, move on with an helicoidal movement. That movement has for its effect to displace the nut —5—, the weight —6— and the pin —9— from the left toward the right side. The pin —9— pushes the valves —10— and —16— towards the right side. The valve —16— shuts the communication between the admitting pipe gear —30— and the brake cylinder —22—. On the other hand, the valve —10— being lifted, a certain amount of air passes through the holes —33— and —15— and enters the brake cylinder —22—. As soon as that amount of air is sufficient to establish in the cylinder —22— a degree of vacuum that enables the wheels to rotate again, the pinion —3— and the screw —4— take the speed of the moment and through inertia, the nut —5— and the weight —6— are put into their former position. Therefore, the valve —10— falls upon its seat —11— and the air can enter no more. Besides, the valve —16— remains on its seat, because the spring —18— is made such as not to counterbalance the differences of the pressures which exist at that instant upon both sides of said valves.

If the jamming is near being reached, the same conditions recur and the valve —10— lets in the amount of air necessary to prevent jamming. It results that the stop is produced without jamming or skidding of the rear wheels.

It must be well understood that the manner of carrying out the invention that has just been described has been exposed only as an instance and that any modification to the invention that does not alter its principle makes part of it; therefore one may adopt any direct or indirect coupling organ between the shaft carrying the screw —4— and the shaft of the speed box or any other rotating part constantly connected to the rear wheels, as well as it may be foreseen that for any constructive reason the rotating weight —6— is not directly fastened on the nut —5—, but is connected to —5— by means of any proper coupling means.

Likewise, the rotating parts of the device may be disposed in or out of the speed box or in any other part, the chamber of the valves may be combined with the brake cylinder and the valves controlled by any proper means.

Last, the hereabove described governor may be applied not only to the motor vehicles but to any other vehicles, whichever may be their nature or destination.

Having thus described my invention, what I claim and desire to secure by Letters Patent is:

1. In a vehicle braking system operating by fluid pressure, a source of pressure, valves connected thereto, a screw-nut associated therewith for opening and closing them, and a weight associated with said nut and rotated by the wheels, whereby when the speed of rotation of the wheels is decreased, the fluid pressure is thereupon lowered just before jamming the wheels.

2. A governor for vacuum or pressure operated vehicle-brakes having pressure fluid cylinders and valve gear, comprising a screw rotated by the drive wheels, and a nut and weight associated with the screw and with the valves, in such a manner that when said wheels are stopped, said nut and weight are displaced helicoidally along said screw by their inertia to operate said valves.

3. A fluid operated pressure or vacuum vehicle braking system, comprising a distributor cylinder, a brake cylinder, a pipe connecting the two, a valve for obturating said pipe, another valve for connecting said pipe to the atmosphere, an endless screw attached to the secondary gear-box shaft, a pinion clutched to said screw, another screw having a nut and weight thereon, and a stem attached to said nut and said valves, whereby a sudden drop in pressure in the brake cylinder displaces the stem and operates said obturating valve on one side, and on the other opens the brake cylinder to atmosphere.

In witness whereof, I have hereunto set my hand this 5 day of February, 1927.

PAUL HALLOT.